Dec. 7, 1943.                T. W. PAUL                2,336,441
                             GRAIN DRILL
                     Filed March 29, 1939          3 Sheets-Sheet 1
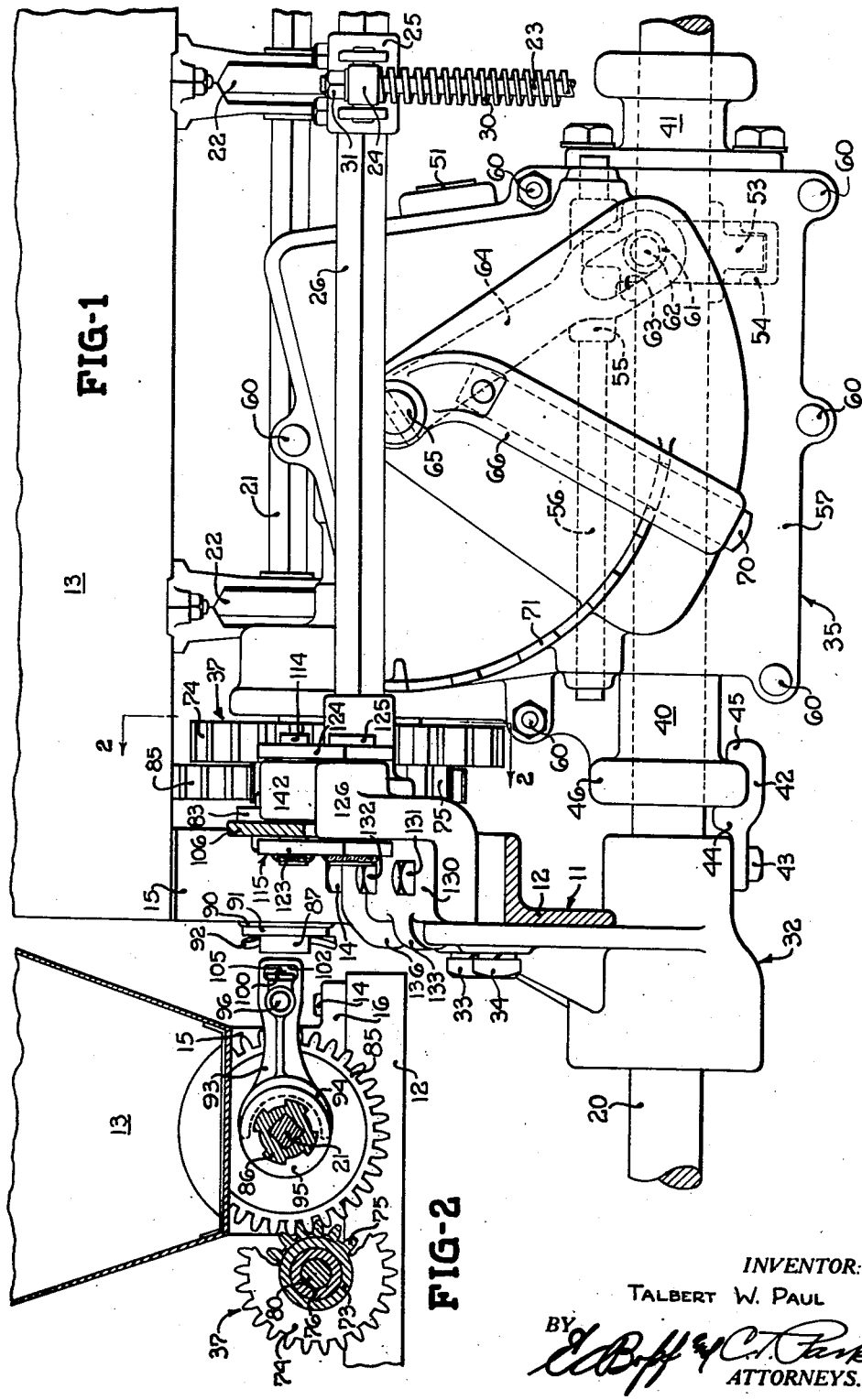
INVENTOR:
TALBERT W. PAUL
BY
ATTORNEYS.

Dec. 7, 1943. T. W. PAUL 2,336,441
GRAIN DRILL
Filed March 29, 1939 3 Sheets-Sheet 2

INVENTOR:
TALBERT W. PAUL
BY
ATTORNEYS.

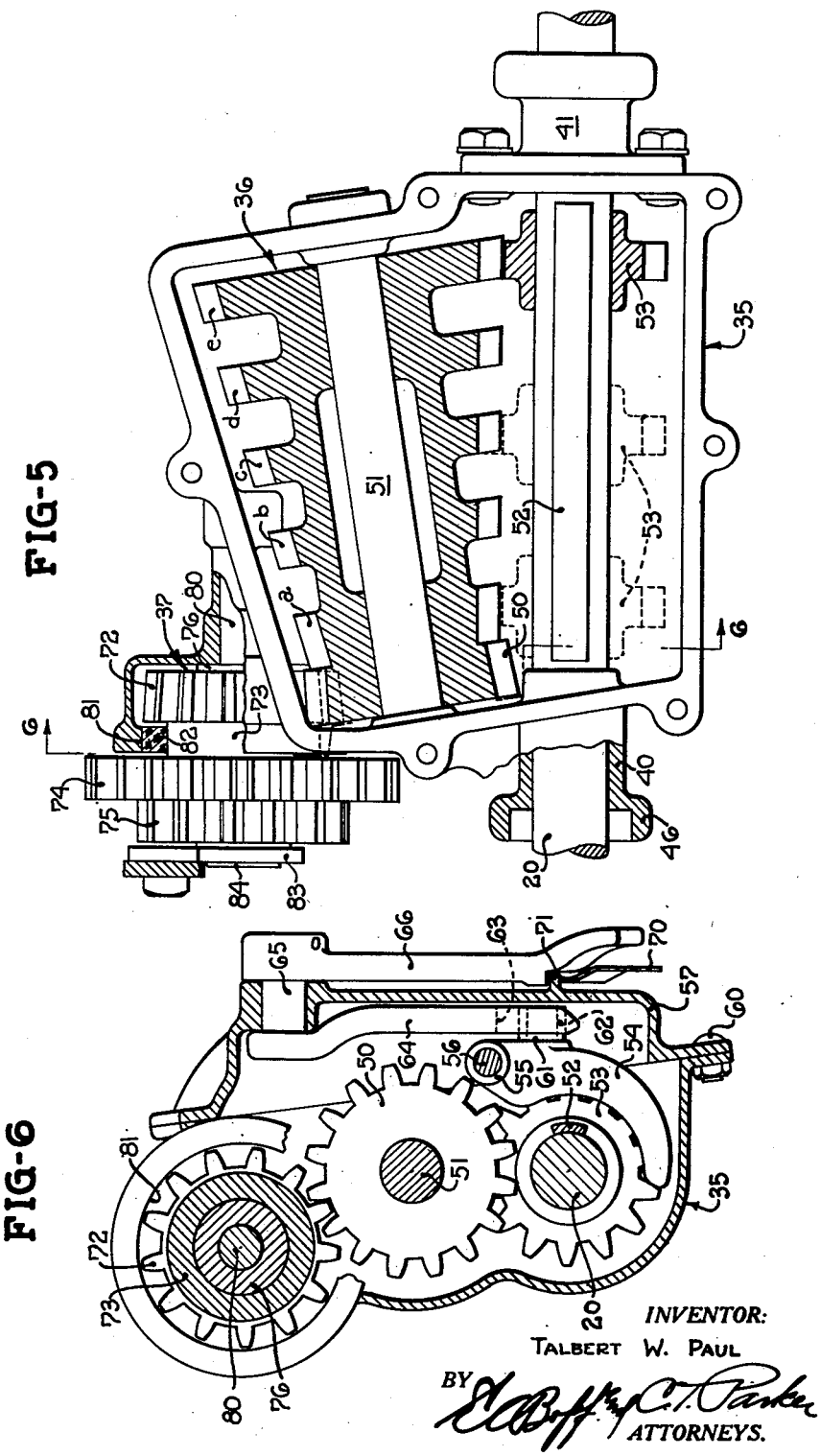

Patented Dec. 7, 1943

2,336,441

UNITED STATES PATENT OFFICE 2,336,441

GRAIN DRILL

Talbert W. Paul, Moline, Ill., assignor to Deere & Company, Moline, Ill., a corporation of Illinois Application March 29, 1939, Serial No. 264,767

22 Claims. (Cl. 74—348)

The present invention relates to grain drills and is more particularly concerned with improvements in the driving mechanism employed for actuating the grain feeding devices from the traction wheels of the implement.

The primary object of the present invention is to provide a selective speed gear driving mechanism of this type in which the principal gears are enclosed for protection against moisture and dirt, and for improved lubrication thereof.

Another object is to provide a selective speed transmission in which a large number of speed changes is afforded, and in which the change from one speed to another can be quickly and easily performed.

A further object of the invention is to provide an improved construction of driving mechanism which will automatically interrupt the operation of the grain feeding devices when the furrow openers are raised from the ground, thus automatically arresting the feed of seed when the implement is being turned at the end of the field or is traveling to or from the field.

Another object is to provide an improved construction of driving mechanism which will function automatically to disengage certain of the gears in the gear train, should the grain feed shaft become locked for any reason. Thus, if stones or other objects should become lodged in the grain feeding devices, causing the drive shaft to seize, the gears are enabled to slip with a ratchet effect and thereby prevent tooth breakage or other damage to the driving mechanism.

These and other objects and advantages of the present invention will become apparent after a consideration of the following detailed description of a preferred embodiment thereof, reference being had to the appended drawings, in which Figure 1 is a fragmentary view of one end of the grain drill, as viewed from the rear;

Figure 2 is a transverse, vertical section taken approximately on the plane of the line 2—2 of Figure 1, and drawn to a reduced scale;

Figure 3 is a fragmentary end view of the grain drill as seen from the left in Figure 1;

Figure 4 is a rear view of the grain feed shaft, showing the driven gear in mesh with the smaller gear on the double-gear unit;

Figure 5 is a partially sectioned view of the gear housing with the cover plate removed, showing the sliding gear in engagement with the compound cone gear; and Figure 6 is a sectional view taken substantially along the line 6—6 of Figure 5.

Referring now to the drawings, the grain drill comprises a generally transverse frame 11 having angle iron end portions 12, which extend rearwardly under the usual grain box 13. The rear end of each frame member 12 is bolted at 14 to a supporting member 15 which is secured to the end of the grain box and which constitutes part of the supporting frame of the machine. The supporting member 15 has outwardly extending flanges 16 at its lower end which seat on the horizontal flanges of the frame members 12, the bolts 14 passing through both of said flanges.

The implement is carried on a pair of ground wheels (not shown) that are mounted on an axle 20, and one or both of the wheels has driving connection with the axle whereby the traction power of such wheel or wheels is transmitted from this axle through the selective speed driving mechanism to a grain feed shaft 21 which extends along the under side of the grain box 13. Mounted on the grain box 13, with the feed shaft 21 extending through them so as to be driven thereby, are the several grain feeding devices 22 that govern the rate of feed of the seed from the box 13 down to the seed boots or spouts (not shown) which are usually associated with suitable furrow openers. Inasmuch as the present invention is not concerned with the furrow openers, seed boots, and related parts, it is not deemed necessary to show and describe the same in detail, and reference may be made to U. S. Patent No. 1,944,672, granted January 23, 1934 to John Schaeffer, for certain typical details of construction. Suffice to say, the furrow openers are connected to the implement frame for vertical movement relative thereto, and each furrow opener is pressed down into the ground by an individual pressure rod 23 which is slidably engaged at its upper end by a collar 24, said collar having trunnion mounting in the forked end of a pressure arm 25 fixed to and extending from a rock shaft 26. A compression spring 30 is confined on the rod 23 below the collar 24, and normally tends to press the furrow opener down into the ground to a depth depending upon the setting of the arm 25. A limit stop nut 31 is threaded onto the upper end of the rod 23 to be engaged by the collar 24 for swinging the furrow opener up out of the ground, through the medium of the rod 23 when the arm 25 is swung upwardly. The rock shaft 26 is preferably of square cross section, and the hubs of the arms 25 have square openings therein for engaging over this shaft. A suitable adjusting lever (not shown) is connected to the shaft 26 for rocking the same and thereby raising the furrow openers out of the ground or adjusting their depth of penetration.

A bearing hub 32 is bolted at 33 and 34 to the vertical flange of the frame member 12, and the axle 20 is rotatably supported therein. The driving whel is fixed to the axle 20 in any suitable manner, and in the preferred construction, each wheel drives the grain feeding device on its side of the implement, the axle in this case being divided in the center into two coaxial sections. It will be understood, however, that the drive of all the grain feeding devices may be effected from one wheel, if desired, in which case the axle would be a through axle, with the other wheel rotating idly thereon.

Rotatably supported on the axle 20 is a housing 35 which serves as a gear support frame for carrying a compound cone gear 36 and an intermediate two step gear unit 37. The housing 35 is provided at each end thereof with bearing portions 40 and 41 journaled on the axle 20 and axially slidable thereon, and is restrained from sliding along the axle by means of a bracket member 42. The bracket member 42 is bolted at 43 to the bearing hub 32, and is provided with shoulders 44 and 45 disposed on either side of, and engaging a radial flange 46 on the bearing portion 40. The housing 35 is thus attached to and positioned from the frame member 12, but is free to rotate on the axle 20.

The compound cone gear 36 is preferably in the form of a casting with five integral gear wheels a, b, c, d, and e, of graduated diameters, and an integral driving gear 50. The compound gear 36 is journaled on the diagonal shaft 51 which is mounted in the housing 35, and the gears a, b, c, d, and e are of the bevel type with their conical faces parallel to the axle 20. A spline key 52 is fixed, as by welding, to the axle 20 within the confines of the housing 35 and is made slightly shorter than the housing to allow for a limited amount of shifting of the axle. Splined to the axle 20 for rotation therewith is a slidable driving gear 53 adapted for selective engagement with any one of the several gears a to e, inclusive. The sliding gear 53 is shifted along the axle by means of a shifter member 54, preferably of U-shaped cross section to embrace the toothed portion of the gear 53 on opposite sides thereof (see Figures 1 and 6) and having a hub portion 55 in sliding engagement with a rod 56 disposed parallel to the axle 20 and mounted in the removable cover 57 of the housing 35. The cover 57 is secured to the housing 35 by a number of bolts 60. A roller 61 is journaled on a stud 62 on the shifter member 54 and is engaged in a slot 63 formed in one end of a lever 64. The other end of the lever 64 is provided with a pivot stud 65 journaled in and extending through the housing cover 57, and pinned to the outer end of the pivot stud 65 is a manually operable gear shift lever 66. Thus, the sliding gear 53 is moved along the axle 20 and successively meshed with the gears a, b, c, d, e, by swinging the gear shift lever 66 about the pivot stud 65.

The sliding gear 53 is positively held in engagement with the desired gear of the cone gear 36 by means of a spring latch 70 riveted or otherwise secured to the under side of the gear shift lever 66 and adapted to engage with an arcuate notched rack 71 provided on the housing cover 57. The notches in the rack 71 correspond in spacing to the cone gears a—e, and when it is desired to shift from one speed to another, the latch 70 is lifted out of seating engagement with its notch and the gear shift lever 66 swung around to register with the notch representing the desired gear ratio. The latch 70 is then released and seats in the notch, locking the lever 66 and with it, the sliding gear 53.

The compound cone gear 36 drives the intermediate two step gear unit 37 through the driving gear 50 which is meshed with a gear 72 on the unit 37. The intermediate gear unit 37 is preferably made as a casting and is provided with a hub portion 73 having the gear 72 at one end thereof and an integral two step gear cluster at the other end, said gear cluster comprising a large spur gear 74 and a small spur gear 75. The gear unit 37 is rotatably supported on a spacer sleeve 76 which is carried, in turn, on a shaft 80 fixedly mounted in the housing 35 parallel to the feed shaft 21. The hub portion 73 extends through an opening 81 in the housing 35, and the gear 72 is disposed within the housing, while the gears 74, 75 are positioned outside of the housing. Referring now to Figures 5 and 6, it will be observed that the opening 81 is larger in diameter than the gear 72, the purpose of this being to facilitate the assembly of the gear unit 37 into the housing by allowing the gear 72 to be inserted through the opening. An oil seal 82, preferably in the nature of a split ring cork gasket, closes the gap between the opening 81 and the hub 73 and seals the housing against the entrance of dirt or the loss of lubricant.

A triangular plate 83, the purpose of which will be discussed in more detail presently, is rotatably supported on the shaft 80 abutting against the outer end of the spacer sleeve 76, and the entire assemblage, consisting of the gear unit 37, sleeve 76, and plate 83 are held on the shaft 80 by a washer 84 suitably fixed, as by welding, to the outer end of the shaft 80. In this connection, it will be noted that the inner end of the sleeve 76 abuts against the housing 35 and that the sleeve is slightly longer than the gear unit 37 so that the latter is allowed a limited amount of axial sliding movement.

The rotation of the intermediate gear unit 37 is transmitted to the feed shaft 21 by means of a gear 85 which may be selectively meshed with either of the spur gears 74, 75. The gear 85 is splined to a sleeve 86 (see Figure 2) having a square hole therein for receiving the end of the square feed shaft 21, and the splined sleeve is provided with a hub portion 87 that is journaled in and extends through a bearing boss 90 (see Figure 3) in the supporting member 15. The sleeve 86 is held in place on the shaft 21 by any suitable means such as the washer 91 mounted on the end of the hub portion 87 for bearing against the outer end of the bearing boss 90, said washer being held by a cotter pin 92 through the hub portion 87 of the sleeve.

The feed shaft gear 85 is shifted along the splined sleeve 86 for engaging either of the gears 74, 75, by means of a shifting member 93, the forked end 94 of which engages an annular groove in the hub 95 of the gear 85. The shifting member 93 is slidably engaged by a rod 96 that is held by a bracket 97 on the supporting member 15 and extends parallel to the feed shaft 21. A spring tongue 100 is bolted at 101 to the bracket 97 and extends parallel to the rod 96, passing through a slot 102 in the shifting member 93. The tongue 100 is provided with two holes 103, 104, corresponding in spacing to the two gears 74, 75, and these holes are adapted to engage a projection 105 on the shifting member 93 to hold the gear 85 in positive engagement with the desired gear 74, 75. To slide the gear 85 along the sleeve 86 from one position to the other, the spring tongue 100 is first lifted to clear the projection 105, after which the shifting member 93 is moved along the rod 96 to bring the projection 105 into register with the other hole 103, 104. As the hole and projection come into registration, the tongue 100 springs into seating engagement over the projection and thereby locks the gear 85 in mesh with the desired gear 74, 75. By thus shifting the gear 85 to mesh with either of the two gears 74, 75, another speed variation is afforded which serves, in effect, to double the total number of speed selections afforded by the variable speed gearing in the housing 35, i. e. when gear 85 is meshed with gear 74, five "fast" speeds are provided, and when gear 85 is meshed with gear 75, five "slow" speeds are provided.

In order that the gear 85 may be meshed with either of the two gears 74, 75, having different diameters, it is necessary that the housing 35 be rocked about the axle 20 to accommodate the distance between centers of the shafts 21 and 80 to the diameters of the gears selected. Such rocking of the housing 35 is performed through the agency of a lever 106 which is bolted at 110 and 111 to the triangular plate 83. The lever 106 is provided with two notches 112 and 113 that are adapted to engage over a pin 114 on a link 115, said lever 106 and link 115 forming a toggle link arrangement for holding the gears 74, 75 in mesh with the feed shaft gear 85. The notches 112, 113 are spaced on the lever 106 so that when notch 113 is engaged over the pin 114, as shown in Figure 3, the housing 35 is brought closer to the feed shaft 21 to allow the smaller gear 75 to mesh with gear 85. Similarly, when notch 112 is engaged over the pin 114, the housing is moved away from the feed shaft sufficiently to allow the larger gear 74 to mesh with the gear 85. The lever 106 is yieldingly held down against the pin 114 by a tension spring 116 that is hooked through an aperture 120 in the lever, and is anchored to a bracket 121 bolted at 122 to the frame member 12.

Referring to Figure 1, the link 115 consists of two spaced parallel bars 123, 124 having transversely disposed pins 114 and 125 connected to their ends. The link 115 is pivoted on pin 125 which is rotatably supported in a bearing block 126 forming part of a mounting bracket 130. The mounting bracket 130 is bolted at 131 and 132 to the top flange of the frame member 12 and is located relative to the gear housing 35 by a guide lug 133 projecting downwardly from the bracket 130 and engaging in a notch 134 in a bearing hub 32. It will be observed in Figure 3 that the bearing hub 32 is located relative to the supporting member 15 by a notch 135 which engages a guide lug 136 projecting downwardly from the mounting flange 16. The connecting bolts 33, 34, 131, and 132 all pass through lengthwise extending slots in the member 12, and in this manner the various elements comprising the transmission unit are assembled and maintained in their proper positions relative to one another without necessitating highly accurate spacing of the bolt holes in the frame member 12. Further in this connection, it will be noted that the bolts 110 and 111 pass through lengthwise extending slots 110' and 111', respectively, in the lever 106, so that when the unit is being assembled on the implement frame, one of the gears 74, 75 may be meshed with the gear 85, the proper notch 112, 113 engaged over the pin 114, and the bolts 110 and 111 then drawn up tight, insuring proper mesh of the gears 74, 75 with gear 85 while allowing wide manufacturing tolerances.

The rock shaft 26 has a round end 27 which is journaled in a bearing portion 140 on the mounting bracket 130. Fixedly mounted on the rock shaft 26 adjacent the bearing portion 140 is an outwardly extending cam 141, said cam being adapted to engage a roller 142 that is journaled on the pin 114 between the bars 123, 124 and to one side of the lever 106. The cam 141 is so set angularly on the shaft 26 that the shaft can be rocked through its full range of depth adjusting movement incident to the depth adjustments of the furrow openers, without engaging the roller 142, but when the shaft 26 is rocked sufficiently to lift the furrow openers clear of the ground, the cam 141 bears against the roller and forces the link 115 to swing upwardly about the pivot pin 125, lifting the lever 106 against the pressure of the spring 116 and thereby swinging the housing 35 forwardly out of mesh with gear 85. Hence, when the furrow openers are lifted to permit travel of the machine to and from the field, the driving train between the axle 20 and feed shaft 21 is automatically disconnected.

Another feature of the toggle link arrangement for holding the gear unit 37 in mesh with the feed shaft gear 85 resides in the fact that the gear housing 35 is allowed to swing forwardly out of driving connection with gear 85 in the event that the feed shaft 21 should become locked against rotation, as when a stone or other object becomes lodged in one of the grain feeding devices 22. Normally, the intermediate gear unit 37 rotates in a clockwise direction, as viewed in Figure 3, driving the feed shaft gear 85 in a counterclockwise direction. When the gear 85 becomes locked against rotation, all the gears are momentarily locked. Hence, the housing 35 and the gears 74 and 75 tend to rotate bodily with the axle 20, clockwise as viewed in Figure 3, thus swinging away from the gear 85. Such forward movement of the housing 35 causes the toggle links 106, 115 to buckle upwardly against the pressure of the spring 116, in a manner well understood by those skilled in the art. The downward force exerted on the toggle link 106 by the spring 116 urges the housing 35 back into driving connection with the gear 85, causing the gear unit 37 to slip ratchet-like into and out of engagement with the gear 85 when the feed shaft 21 becomes locked. The toggle linkage thus exerts its greatest holding power when the parts are in normal position, but as soon as the housing 35 begins to move away from the gear 85, the holding power of the linkage decreases, so that the interruption is made without delay. The toggle linkage is therefore in the nature of a safety overload device effective when the implement is moving forward in a normal manner to sustain normal forces but yieldable under abnormal loads.

It is believed that the general operation of the driving mechanism will be clearly understood from the preceding description of the several parts thereof. The preferred embodiment described thus far and illustrated in the appended drawings provides for ten speed changes between the axle 20 and feed shaft 21, this number of speed variations having been found, in practice, to be sufficient for the great majority of requirements.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

I claim:

1. In a grain drill having a grain feed shaft and a rotating axle, selective speed, power transmission mechanism for driving said feed shaft from said axle, said mechanism comprising in combination an enclosed gear support housing mounted on said axle for swinging movement, a compound cone gear journaled within said housing, a shiftable gear on said axle adapted for selective engagement with different portions of said cone gear, a gear wheel on said grain feed shaft, gear means operatively connected with said cone gear and extending through said support housing, said gear means including at least one gear wheel disposed outside of said housing and adapted to mesh with the gear wheel on said grain feed shaft, and means for swinging said housing about said axle to bring said outside gear wheel into mesh with said feed shaft gear wheel.

2. In a grain drill having a grain feed shaft and a driving shaft, driving mechanism for connecting said shafts comprising in combination, a gear support structure journaled on said driving shaft, a compound cone gear journaled on said gear support structure with its axis of rotation at an angle to the axis of said driving shaft, a shiftable gear on said driving shaft and adapted for selective engagement with different portions of said cone gear, a driven gear operatively connected with said grain feed shaft, intermediate gear means driven from said cone gear and rotatably supported on and movable in said structure, said intermediate gear means being adapted to mesh with said driven gear, and means for swinging said support structure about said driving shaft to move said intermediate gear means into and out of mesh with said driven gear.

3. In a grain drill having a grain feed shaft and a rotating axle, selective speed, power transmission mechanism for driving said feed shaft from said axle, said mechanism comprising in combination, a gear support structure journaled on said axle, a compound cone gear carried by said support structure with its axis inclined to the axis of said axle, the face of said cone gear being disposed substantially parallel with said axle, a shiftable gear on said axle adapted for selective engagement with different portions of said cone gear, a driven gear on said grain feed shaft, an intermediate gear unit journaled on said support structure with its axis substantially parallel to said grain feed shaft, said intermediate unit being adapted to mesh with said driven gear, driving connection between said intermediate gear unit and said cone gear, and means for rocking said support structure on said axle to carry said intermediate gear unit into and out of operative mesh with said driven gear.

4. In a grain drill including a grain feed shaft and a driving shaft, selective speed, power transmission mechanism operatively connecting said shafts comprising in combination, a gear support structure mounted on said driving shaft for rocking movement thereon, gear means journaled on said support structure and operatively connected with said driving shaft, intermediate gear means journaled on said support structure and having driving connection with said gear means, said intermediate gear means comprising two gear portions of different diameters, a driven gear slidably mounted on said grain feed shaft and adapted to mesh with either of said gear portions, means for shifting said driven gear along said grain feed shaft, and means for rocking said gear support structure on said driving shaft to carry said intermediate gear means into and out of mesh with said driven gear.

5. Selective speed, power transmission mechanism for operatively connecting driving and driven shafts comprising, in combination, a driving gear adapted to be operatively connected with said driving shaft, a driven gear adapted to be operatively connected with said driven shaft, intermediate gear means operatively connecting the driving and driven gears, said intermediate gear means being supported for swinging movement about one of said shafts into and out of engagement with the gear on the other shaft, toggle link means anchored at one end and connected at the other end with said intermediate gear means, and means acting against said toggle link means for swinging said intermediate gear means out of engagement with the said gear, said toggle link means being extensible to provide different ranges of swinging movement to accommodate different sizes of gears.

6. Selective speed, power transmission mechanism for operatively connecting driving and driven shafts, comprising a gear support structure journaled on the driving shaft and swingable thereon, gear means carried on said gear support structure and operatively connected with said driving shaft, and a driven gear operatively connected with the driven shaft and adapted to mesh with said gear means, a toggle link device connected at one end to said gear support structure, a rock shaft, and a cam on said rock shaft adapted to engage said toggle device to swing the gear support away from said driven shaft and thereby disconnect said gear means from said driven gear when the rock shaft is rocked, said toggle device including a link of adjustable length to provide more than one range of swinging movement of said gear support to accommodate different sizes of gears.

7. Selective speed, power transmission mechanism for operatively connecting driving and driven shafts, comprising a gear support structure journaled on the driving shaft and swingable thereon, a driving gear operatively connected with said driving shaft, intermediate gear means carried on said gear support structure and having driving connection with said driving gear, said intermediate gear means comprising two gear portions of different diameters, a driven gear operatively connected with the driven shaft and adapted to mesh with either of said gear portions, a toggle joint anchored at one end and connected at the other end with said gear support to said frame, a rock shaft, and a cam fixed to said rock shaft and operable to angle said toggle when the shaft is rocked to swing the gear support away from said driven shaft and thereby disconnect said gear means from said driven gear, said toggle joint comprising two members, and means for pivotally connecting them together at either of two spaced points whereby the toggle joint is spaced substantially the same distance from the cam when said driven gear is in mesh with either of the two gear portions on said intermediate gear.

8. Selective speed, power transmission mechanism for operatively connecting driving and driven shafts, comprising a gear support structure journaled on said driving shaft and swingable thereon, a driving gear operatively connected with said driving shaft, intermediate gear means carried on said gear support structure and having driving connection with said driving gear, a driven gear operatively connected with said driven shaft and adapted to mesh with said intermediate gear means, a normally angled toggle joint connected with said gear support, and spring means for exerting a force on said toggle joint tending to straighten the same, thereby yieldingly urging said intermediate gear means into mesh with said driven gear, said intermediate gear being so positioned relative to said driven gear that an overload will cause the teeth of the intermediate gear to coact with the teeth of the driven gear and thrust the gear support structure away from said driven shaft against the force exerted on said toggle by said spring means, interrupting the drive.

9. In a grain drill including a grain feed shaft and a driving shaft, selective speed, power transmission mechanism operatively connecting said shafts comprising in combination, a driving gear operatively connected with said driving shaft, a driven gear operatively connected with said grain feed shaft and slidable axially thereon, intermediate gear means operatively connecting the driving and driven gears and including a pair of coaxial gears of different diameters adapted to mesh selectively with said slidable gear, said intermediate gear means being supported on said drive shaft for swinging movement thereon into and out of engagement with said slidable gear, a lever connected with said intermediate gear means for swinging the latter, resilient means tending to hold said intermediate gear means in engagement with said slidable gear, a rocking member for actuating said lever to disengage the gears, and means for interchangeably connecting said rocking means selectively with said lever at either of two spaced points on the latter, said points corresponding to the two positions of said intermediate gear means when said slidable gear is in mesh with one or the other of said pair of gears, respectively.

10. In a grain drill including a grain feed shaft and a driving shaft, selective speed, power transmission mechanism operatively connecting said shafts comprising in combination, a driving gear operatively connected with said driving shaft, a driven gear operatively connected with said grain feed shaft and slidable axially thereon, intermediate gear means operatively connecting the driving and driven gears and including a pair of coaxial gears of different diameters adapted to mesh selectively with said slidable gear, said intermediate gear means being supported on said drive shaft for swinging movement thereon into and out of engagement with said slidable gear, a lever connected with said intermediate gear means for swinging the latter, a rocking arm engageable with said lever at spaced points along the latter corresponding to the positions of said intermediate gear means when said slidable gear is in mesh with one or the other of said pair of gears, respectively, spring means for holding the gears in mesh, said gears being adapted to coact against each other to disengage themselves against the action of said spring when the grain feed shaft becomes overloaded, and a rock shaft having means engaging said rocking member for rocking the latter to swing said lever to render inoperative said grain feed shaft.

11. In an implement having a driving shaft and a driven shaft, selective speed power transmission operatively connecting said shafts, comprising a housing swingably mounted on one of said shafts, a pair of axially spaced gear members swingable with said housing and extending exteriorly thereof, means in said housing for driving said gear member from said one shaft at different peripheral speeds, and a shiftable speed selecting gear mounted on the other shaft and optionally engageable with either of said axially spaced gear members.

12. In an implement having a driving shaft and a driven shaft, selective speed power transmission operatively connecting said shafts, comprising a first speed change unit including a casing mounted for rocking movement on one of said shafts, a cone gear within said casing, means for driving said cone gear, a pair of axially spaced gears extending outside said casing and driven at different peripheral speeds from said cone gear, and a first shiftable part for controlling the speed of rotation of said cone gear, a shiftable gear mounted on the other shaft and optionally engageable with either of said axially spaced gear members, and a second shiftable part, separate from the first part, for shifting said shiftable gear.

13. In a transmission for connecting driving and driven shafts, a gear support unit swingably mounted on one of said shafts and including a pair of axially spaced gear members geared to said one shaft so as to rotate at different peripheral speeds, one with respect to the other, a shiftable speed selecting gear mounted on the other shaft and optionally engageable with either of said axially spaced gear members, biased toggle means acting against said swingable gear support unit for holding either of said gear members in mesh with the shiftable speed selecting gear, and means for breaking said toggle means and permitting said gear and associated gear member to disengage.

14. In a transmission for connecting driving and driven shafts, a driving gear operatively connected with said driving shaft, a sleeve journaled on said driven shaft, a driven gear slidably but non-rotatably mounted on said sleeve, intermediate gear means interconnecting said driving and driven gears and including a pair of coaxial gears adapted to mesh with said driven gear, selectively, by sliding the latter along said sleeve, means for driving said coaxial gears at different rates, and means for driving said driven shaft from said sleeve at selective rates.

15. In an implement having a driving shaft and a driven shaft, selective speed power transmission operatively connecting said shafts, comprising a gear on said driven shaft, a gear support unit swingably mounted on said drive shaft and including a gear in driving connection with said drive shaft adapted to releasably engage said first gear, said gears being disengaged from each other by swinging said gear support unit about said drive shaft in the normal direction of rotation of said drive shaft, whereby an obstruction to the rotation of said driven shaft momentarily locks said gears against relative rotation, thereby causing said gear support unit to swing integrally with said drive shaft to disengage said gear on said unit from said driven gear, and means acting against said gear support unit for yieldingly holding said gears in mesh.

16. In an implement having a driving shaft and a driven shaft, selective speed power transmission operatively connecting said shafts, comprising a gear on said driven shaft, a gear support unit swingably mounted on said drive shaft and including a gear in driving connection with said drive shaft adapted to releasably engage said first gear, said gears being disengaged from each other by swinging said gear support unit about said drive shaft in the normal direction of rotation of said drive shaft, whereby an obstruction to the rotation of said driven shaft momentarily locks said gears against relative rotation, thereby causing said gear support unit to swing integrally with said drive shaft to disengage said gear on said unit from said driven gear, and spring actuated toggle link means acting against said gear support unit for holding said gears in mesh so as to transmit normal driving forces and accommodating disengagement thereof upon the occurrence of an overload.

17. In a grain drill having a frame and a grain feed shaft, power transmission mechanism for driving said grain feed shaft including a swingably mounted part, movement of which controls the drive to said grain feed shaft, a rock shaft on said frame, a pair of links one connected with said swingable part and the other pivoted to said frame, means pivotally connecting said links, spring means acting through said links to swing said part in one direction, and means on said rock shaft engageable with the means for pivotally interconnecting said links for swinging said swingable part in the other direction.

18. In an agricultural implement including a member to be driven and a supporting frame, power transmission mechanism for driving said member including a swingable part movable into either of two positions, one in which said part engages said member and the other in which said part is out of engagement with said member, a spring biased toggle joint connected between said frame and said swingable part for yieldingly holding the latter in said one position to transmit the drive to said member, said toggle joint comprising two members, and means for pivotally connecting them together at either of two spaced points whereby said toggle joint may be arranged to hold said swingable part in said other position disconnecting the drive to said member.

19. In an agricultural implement including a supporting frame, a member to be driven, and a rock shaft on said supporting frame, power transmission mechanism including a swingable part for driving said member, said swingable part being movable into either of two positions, one in which said part engages said member and the other in which said part is out of engagement with said member, a toggle joint connecting said swingable part with said supporting frame and including two members, one being pivoted to said supporting frame and the other to said swingable part, a cam fixed to said rock shaft and operable to angle said toggle when the shaft is rocked so as to swing said swingable part to a position to disengage the drive to said member, and means for pivotally connecting said toggle joint members together at either of two spaced points, whereby the toggle joint may be arranged to hold said swingable part in a position disconnecting the drive to said member, irrespective of the position of said cam.

20. In an agricultural implement, a driven gear unit, a driving gear unit mounted for swinging movement into and out of engagement with said driven unit, one of said units including gears of different size with either of which the other unit is adapted to be moved to different positions to engage, mechanism connecting said units and arranged so that the driving reaction tends to separate said units, and trip mechanism connectible in two different positions to accommodate the optional engagement of said gear units and arranged for releasably holding said units in engagement in either position against normal driving reaction.

21. In an agricultural implement, a driven gear unit, a driving shaft, a carrier mounted for swinging movement about the axis of said shaft, a driving gear unit geared to said shaft and mounted on said carrier so as to be swingable into and out of engagement with said driven gear unit, said driving shaft normally rotating in a direction to swing said carrier away from the driven gear unit when driving the latter and acting to separate said units upon the occurrence of an overload, and yieldable means acting against said carrier for holding said units in engagement.

22. In an agricultural implement having a rotatable axle and a part to be driven, an enclosed gear support housing mounted on said axle for swinging movement, a compound cone gear journaled within said housing, a shiftable gear on said axle adapted for selective engagement with different portions of said cone gear, means driven from said cone gear and extending through said support housing and adapted by swinging of the latter to be carried into and out of engagement with said part, and means for swinging said housing about said axle.

TALBERT W. PAUL.